United States Patent
Nakamura

[11] Patent Number: 6,138,733
[45] Date of Patent: *Oct. 31, 2000

[54] PNEUMATIC RADIAL TIRE WITH A TWO PART CHAFER

[75] Inventor: Yoichi Nakamura, Kodaira, Japan

[73] Assignee: Bridgestone Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/038,094

[22] Filed: Mar. 11, 1998

[30] Foreign Application Priority Data

Mar. 25, 1997 [JP] Japan ..................................... 9-071749

[51] Int. Cl.$^7$ .................................................. B60C 15/06
[52] U.S. Cl. ........................... 152/543; 152/539; 152/547
[58] Field of Search ..................... 152/539, 542, 152/543, 544, 546, 547, 525

[56] References Cited

U.S. PATENT DOCUMENTS

| | | | |
|---|---|---|---|
| 5,033,524 | 7/1991 | Ohtsuka | 152/542 |
| 5,048,584 | 9/1991 | Nakano et al. | 152/543 |

FOREIGN PATENT DOCUMENTS

| | | | |
|---|---|---|---|
| 2 742 098 | 6/1997 | France. | |
| 3-42310 | 2/1991 | Japan. | |
| 3042-309A | 2/1991 | Japan | 152/539 |

*Primary Examiner*—Michael W. Ball
*Assistant Examiner*—Barbara J. Musser
*Attorney, Agent, or Firm*—Sughrue, Mion, Zinn, Macpeak & Seas, PLLC

[57] ABSTRACT

A bead portion durability of a pneumatic radial tire for large-size vehicle is improved by disposing a combination of a first protection rubber layer A having a 100% modulus of 25–40 kgf/cm$^2$ and a second protection rubber layer B having a 100% modulus of 30–50 kgf/cm$^2$ in given places of the bead portion so as to locate an inner end of the first protection rubber layer A in the radial direction of the tire between an outer end of a curved face of the bead heel in the radial direction and an end of a curved face of a rim flange and locate an outer end of the second protection rubber layer B in the radial direction of the tire at such a position outward in the radial direction of the tire that an inclination angle defined between a line segment connecting this end to a curvature center of the curved face of the rim flange and a phantom line passing through the curvature center and in parallel to a rotating axis of the tire is not less than 20°.

2 Claims, 5 Drawing Sheets

FIG_1

*Comparative*

*Comparative*

PNEUMATIC RADIAL TIRE WITH A TWO PART CHAFER

BACKGROUND OF THE INVENTION

1. Field of the Invention

This invention relates to a pneumatic radial tire for large-size vehicles such as truck, bus, construction vehicle and the like, and more particularly to a pneumatic radial tire for large-size vehicles having an excellent durability of a bead portion.

2. Description of Related Art

A pneumatic radial tire to be mounted onto a large-size vehicle, for example, a construction vehicle such as a large-size dump truck used in a large-size engineering work site or ore mining site is subjected to severer service conditions on rough roads under a heavy load, so that there are frequently caused troubles in a bead portion contacting with a rim.

In this type of the tire, a protection rubber layer called as a rubber chafer is arranged in a portion contacting with a rim. As performances required in the protection rubber layer, there are mentioned (1) air permeability is less, (2) a bead portion hardly slips against the rim, and (3) cracks hardly occur through friction with a rim flange. In order to satisfy the above performances (1) and (2), it is advantageous to use rubber having high modulus and a less deterioration with a lapse of time in the protection rubber layer. In order to satisfy the above performance (3), it is advantageous to use rubber having a low modulus, so that both rubbers are conflicting with each other in the material properties.

When the protection rubber layer having a high modulus is used for satisfying the performances (1) and (2), therefore, there has hitherto been adopted a structure of disposing a wire chafer on an outside of a carcass as a countermeasure for preventing the occurrence of cracks due to the friction with the rim flange. In this case, however, separation failure is easy to be caused in an end of the wire chafer, particularly an end thereof located at the outside of the carcass as a starting point, so that this countermeasure becomes disadvantageous in view of the durability.

On the other hand, when the protection rubber layer having a low modulus is used for satisfying the performance (3), the performances (1) and (2) are ensured by approaching a position of a bead core to a side of the rim to increase a compression ratio of a bead base rubber after the rim assembling onto the rim to thereby strongly push a bead portion toward the rim. In this case, however, the rim assembling operation is obstructed as the compression ratio of the bead base rubber becomes higher and also the falling down of a sidewall portion increases due to the low modulus of the protection rubber layer, so that it is disadvantageous to have a bad influence upon the steering stability.

SUMMARY OF THE INVENTION

It is, therefore, an object of the invention to provide a pneumatic radial tire for large-size vehicle capable of developing sufficient durability of a bead portion even under severe service conditions subjected to repetitive compression deformation by providing a bead portion structure simultaneously satisfying various performances required in the protection rubber layer.

The inventors have made various studies with respect to a way for satisfying various performances required in the protection rubber layer and found that it is effective to use two rubbers in the protection rubber layer and rationalize arrangements thereof, and as a result the invention has been accomplished.

According to the invention, there is the provision of in a pneumatic radial tire for large-size vehicle comprising a cylindrical crown portion, a pair of sidewall portions extending inward from both ends of the crown portion in a radial direction, a pair of bead portions extending inward from the sidewall portions, and a radial carcass extending between the bead portions through the crown portion, the improvement wherein a first protection rubber layer A having a 100% modulus of 25–40 kgf/cm$^2$ is disposed in a region ranging from a vicinity of a bead heel to a rim line along an outer surface of the tire when the tire is mounted onto a standard rim and inflated under an internal pressure, and a second protection rubber layer B having a 100% modulus of 30–50 kgf/cm$^2$ (which is higher than that of the first protection rubber layer A) is disposed in a region ranging from an inside of the first protection rubber layer A in a widthwise direction of the tire to a bead base, and an inner end of the first protection rubber layer A in the radial direction of the tire is located between an outer end of a curved face of the bead heel in the radial direction and an end of a curved face of a rim flange, and an outer end of the second protection rubber layer B in the radial direction of the tire is located at such a position outward in the radial direction of the tire that an inclination angle defined between a line segment connecting this end to a curvature center of the curved face of the rim flange and a phantom line passing through the curvature center and in parallel to a rotating axis of the tire is not less than 20°.

The term "standard rim" used herein means a rim having an approved size defined in 1996 JATMA YEAR BOOK, while the term "internal pressure" means an air pressure corresponding to a maximum load capacity at an approved size and a ply rating defined in 1996 JATMA YEAR BOOK.

BRIEF DESCRIPTION OF THE DRAWINGS

The invention will be described with reference to the accompanying drawings, wherein.

DESCRIPTION OF PREFERRED EMBODIMENTS

Figure 1:
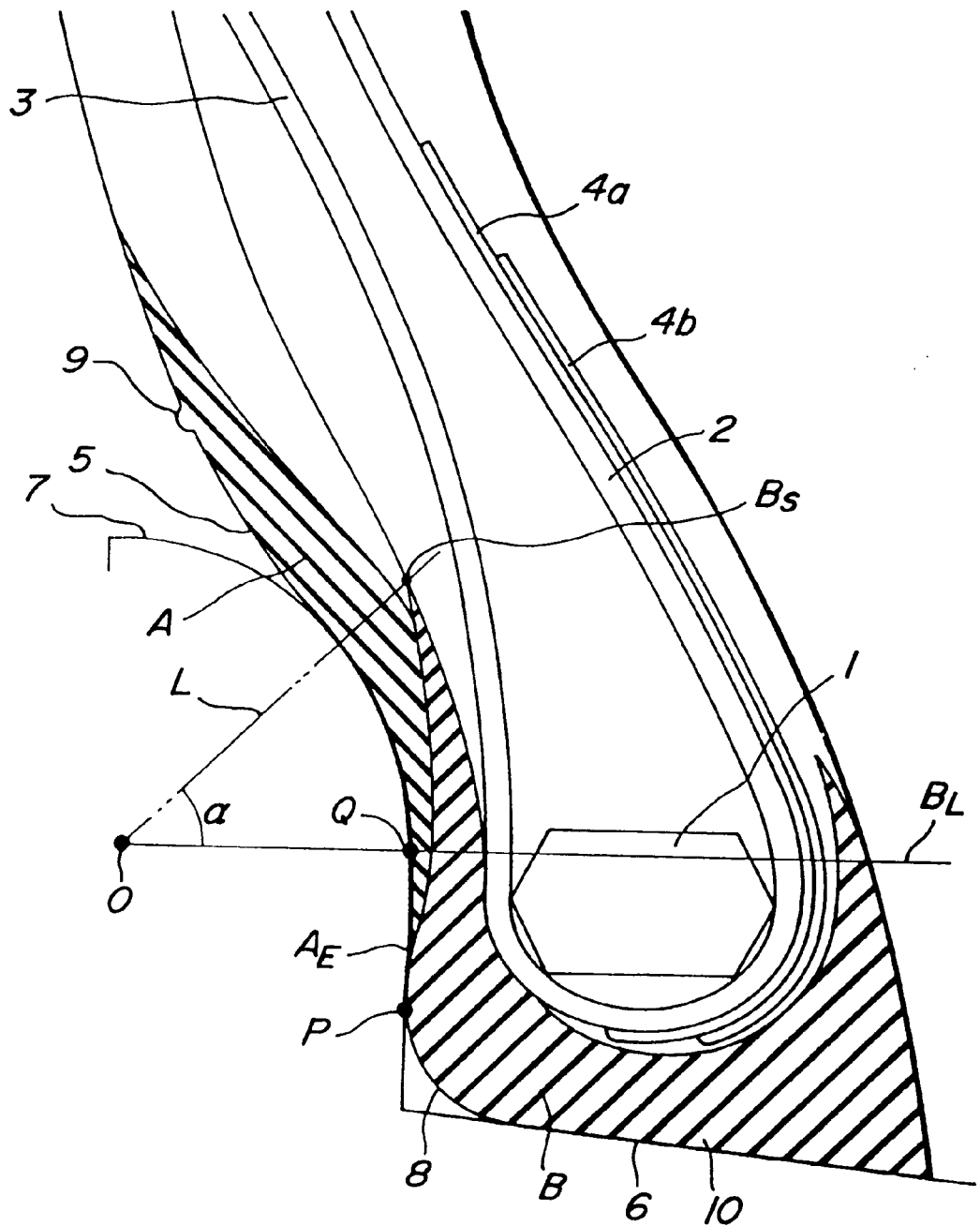
FIG. 1 is a diagrammatically partial section view of a main part of an embodiment of the pneumatic radial tire according to the invention.

In FIG. 1 is shown a left-half section of the pneumatic radial tire for construction vehicle according to the invention in the neighborhood of its bead portion, wherein numeral 1 is a bead core, numeral 2 a carcass, numeral 3 a turnup portion of the carcass 2, numerals 4a, 4b reinforcing layers of steel cords mainly disposed inside the carcass 2, numeral 5 a bead portion, numeral 6 a standard rim, and numeral 7 a flange of the rim.

The carcass 2 comprises a rubberized steel cord ply of a radial arrangement toroidally extending between a pair of the bead cores 1 and wound around the bead core 1 from inside of the tire toward outside thereof so as to form the turnup portion 3.

In the bead portion 5 are arranged a first protection rubber layer A having a 100% modulus of 25–40 kgf/cm$^2$ and a second protection rubber layer B having a 100% modulus of 30–50 kgf/cm$^2$, in which the first protection rubber layer A is disposed in a region ranging from a vicinity of a bead heel 8 to at least a rim line 9 outward in the radial direction of the tire along an outer face of the tire and the second protection rubber layer B is disposed in a region ranging from the inside of the first protection rubber layer A in the widthwise direction of the tire to a bead base 10, whereby various performances required as a protection rubber layer in the bead portion are satisfied.

When the 100% modulus of the second protection rubber layer B is less than 30 kgf/cm$^2$, the pressing force of the bead portion to the rim lowers to create slipping of the bead portion on the rim and it is difficult to control the falling down of the sidewall portion. When it exceeds 50 kgf/cm$^2$, cracks are liable to be caused and the rim assembling property is obstructed and becomes unfit for practical use.

Moreover, the combined arrangement of protection rubber layers establishing the crack resistance and the resistance to rim slippage at a high level is realized by making the 100% modulus of the second protection rubber layer B higher than that of the first protection rubber layer A. In this case, when the 100% modulus of the first protection rubber layer A is less than 25 kgf/cm$^2$, the crack resistance is improved, but the bead portion is slipped from the rim or so-called flatting is caused. When it exceeds 40 kgf/cm$^2$, the flatting is improved, but the crack resistance is degraded to create diagonal crack or the like.

Further, it is important that an inner end $A_E$ of the first protection rubber layer A in the radial direction of the tire is located between an outer end P of a curved face of the bead heel 8 in the radial direction and an end Q of a curved face of the rim flange 7, and an outer end Bs of the second protection rubber layer B in the radial direction of the tire is located at such a position outward in the radial direction of the tire that an inclination angle α defined between a line segment L connecting this end $B_S$ to a curvature center 0 of the curved face of the rim flange 7 and a phantom line BL passing through the curvature center O and in parallel to a rotating axis of the tire is not less than 20°.

When the inner end $A_E$ of the first protection rubber layer A is located inward in the radial direction from the outer end P of the curved face of the bead heel 8 in the radial direction, the pressing force of the bead portion to the rim lowers to create slipping of the bead portion on the rim and also falling down of the sidewall portion is caused. On the other hand, since a zone generating cracks is mainly existent outward from the end Q of the curved surface of the rim flange 7 in the radial direction of the tire, if the inner end $A_E$ is located outward from the end Q in the radial direction, the first protection rubber layer A durable to cracking may be not arranged in this zone and the second protection rubber layer B is arranged in such a zone, so that cracks are generated in the second protection rubber layer B.

When the end $B_S$ of the second protection rubber layer B is located in a position corresponding to the inclination angle α of less than 20°, the volume of the second protection rubber layer B existing in a back region of the first protection rubber layer A is less and hence the pressing force of the bead portion to the rim lowers to create slipping of the bead portion on the rim and also falling down of the sidewall portion becomes conspicuous. On the other hand, if the position of the end $B_S$ corresponds to the inclination angle α of more than 80°, there is a fear of getting the end $B_S$ into a zone of large sidewall deformation to cause separation failure at an end of the second protection rubber layer B having a high modulus. Thus it is preferable to dispose the end $B_S$ inward from the position corresponding to the inclination angle α of 80° in the radial direction of the tire.

Figure 2:
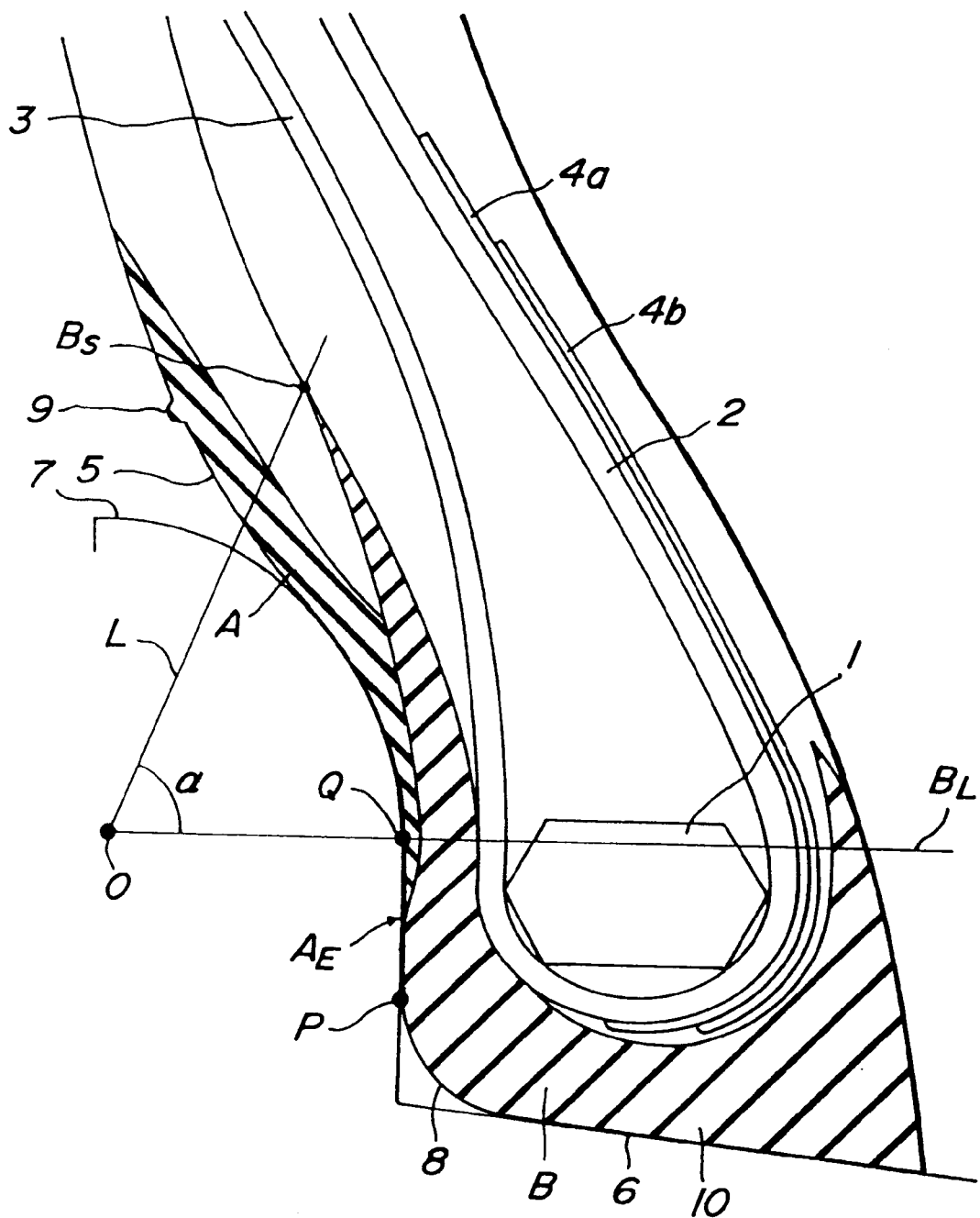
FIG. 2 is a diagrammatically partial section view of a main part of another embodiment of the pneumatic radial tire according to the invention.
Figure 3:
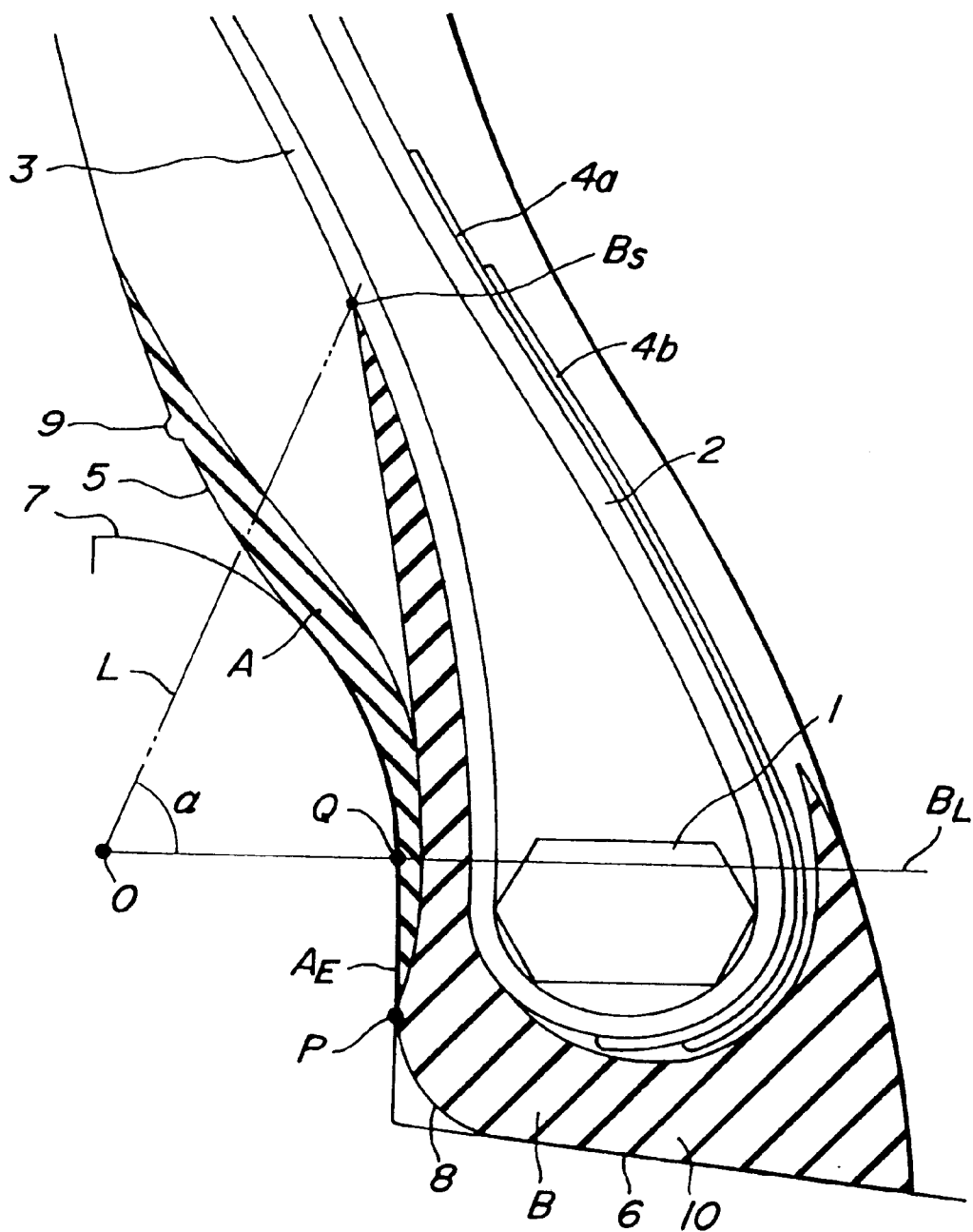
FIG. 3 is a diagrammatically partial section view of a main part of the other embodiment of the pneumatic radial tire according to the invention.

In FIGS. 2 and 3 are shown embodiments of disposing the end $B_S$ of the second protection rubber layer B outward from the case of FIG. 1 in the radial direction of the tire, respectively.

That is, FIG. 2 is an effective case of increasing the pressing force of the bead portion against the rim to prevent slippage of the bead portion on the rim by disposing the end $B_S$ between the first protection rubber layer A and the turnup portion 3 of the carcass outward from the case of FIG. 1 in the radial direction of the tire. In this case, the inclination angle α is about 65°. On the other hand, FIG. 3 is an effective case of controlling the falling down of the sidewall portion by disposing the end $B_S$ along the turnup portion 3 of the carcass outward from the case of FIG. 1 in the radial direction of the tire. In this case, the inclination angle α is about 65°. On the contrary to these cases, FIG. 1 is an effective case of avoiding the shifting of the bead portion in the rim assembling by disposing the end $B_S$ inward in the radial direction of the tire to thicken the first protection rubber layer A. In this case, the inclination angle α is about 45°.

The following examples are given in illustration of the invention and are not intended as limitations thereof.

Figure 4B:
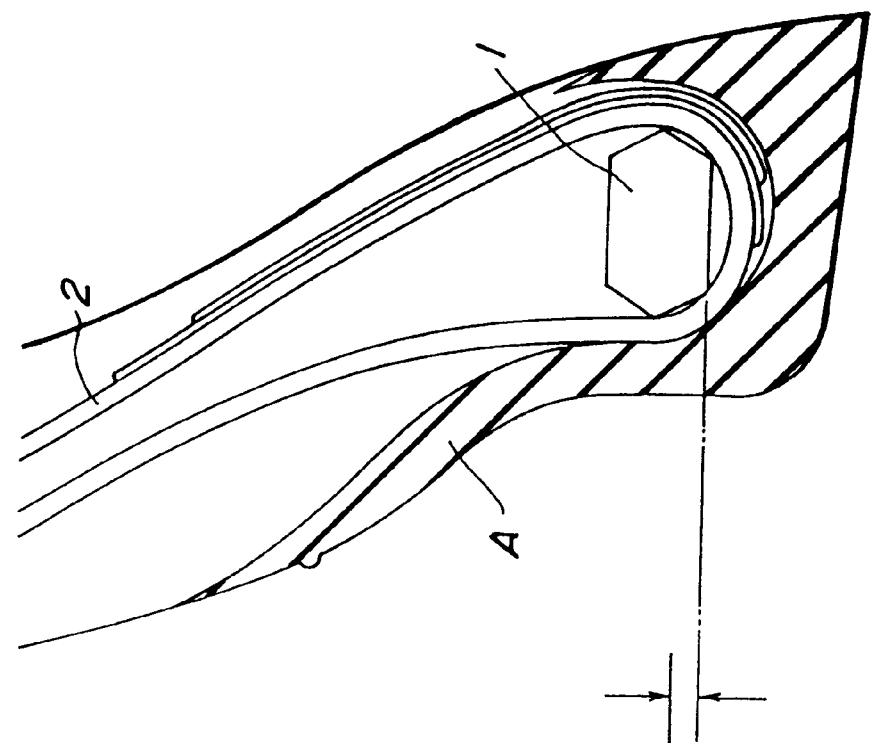
FIGS. 4a and 4b are diagrammatically partial section views illustrating a main part of a bead portion reinforcing structure as a comparative example.
Figure 4A:
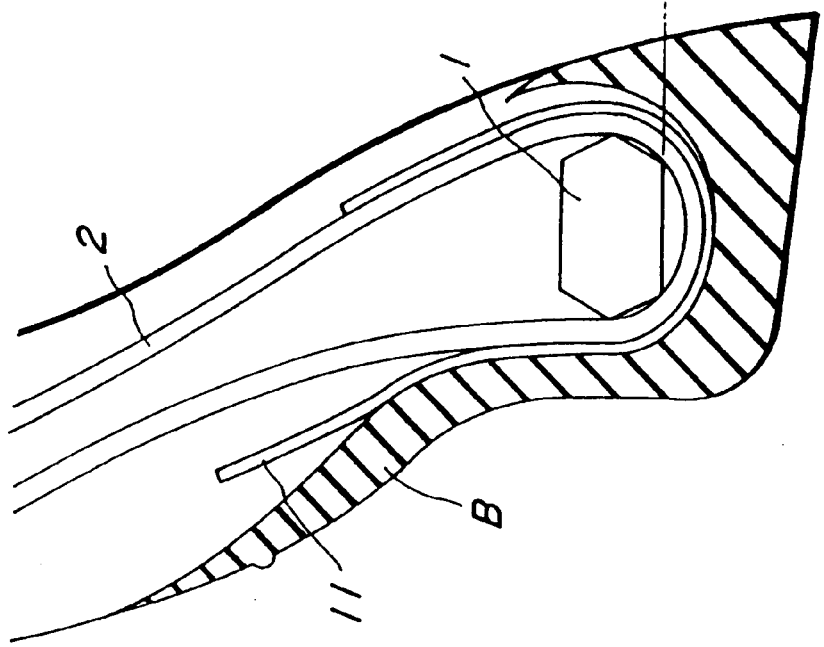

Three pneumatic tires for construction vehicle having a tire size of 26.5R25☆ (corresponding to PR of 26.5-25) are prepared according to a structure as shown in FIGS. 1–3 under a specification shown in Table 1. For the comparison, there are prepared two tires having a structure as shown in FIGS. 4a and 4b. That is, the tire of FIG. 4a has a structure with only a protection rubber layer B having a high modulus arranged without a protection rubber layer A and a wire chafer wound around a bead core along an outer face of the carcass. The tire of FIG. 4b has a structure with only a protection rubber layer A having a low modulus arranged without a protection rubber layer B and a position of the bead core is located near to the rim as compared with the tire of FIG. 4a to enhance the compression ratio of the bead base rubber to thereby strongly push the bead portion onto the rim.

The following properties are evaluated with respect to these tires to obtain results as shown in Table 1.

Each of the tires is mounted onto a standard rim and run on a drum of 5 m in diameter at a speed of 10 km/h under an air pressure of 5.0 kgf/cm$^2$ and a test load of 22500 kg (150% load) to conduct a durability test. In this case, the separation resistance is evaluated by a running time until separation failure is created in a zone along the turnup portion outward from the tire or at an end portion of the wire chafer (see FIG. 4a), while the crack resistance is evaluated by product of crack number and depth measured on the surface of the bead portion after the running for 50 hours. Each of these properties is represented by an index on the basis that Example 1 is 100, in which the larger the index value, the better the property.

Figure 5:
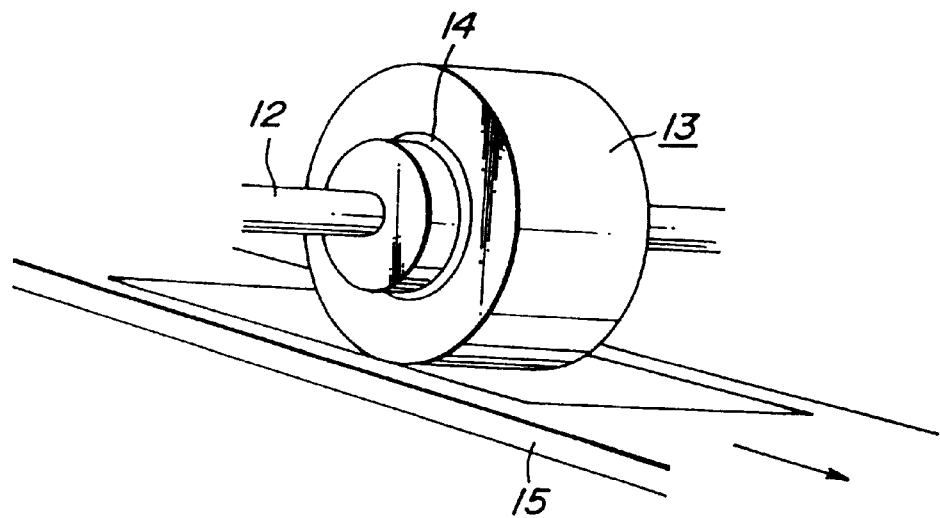
FIG. 5 is a schematic view illustrating an evaluation outline of a rim slippage.
Figure 6:
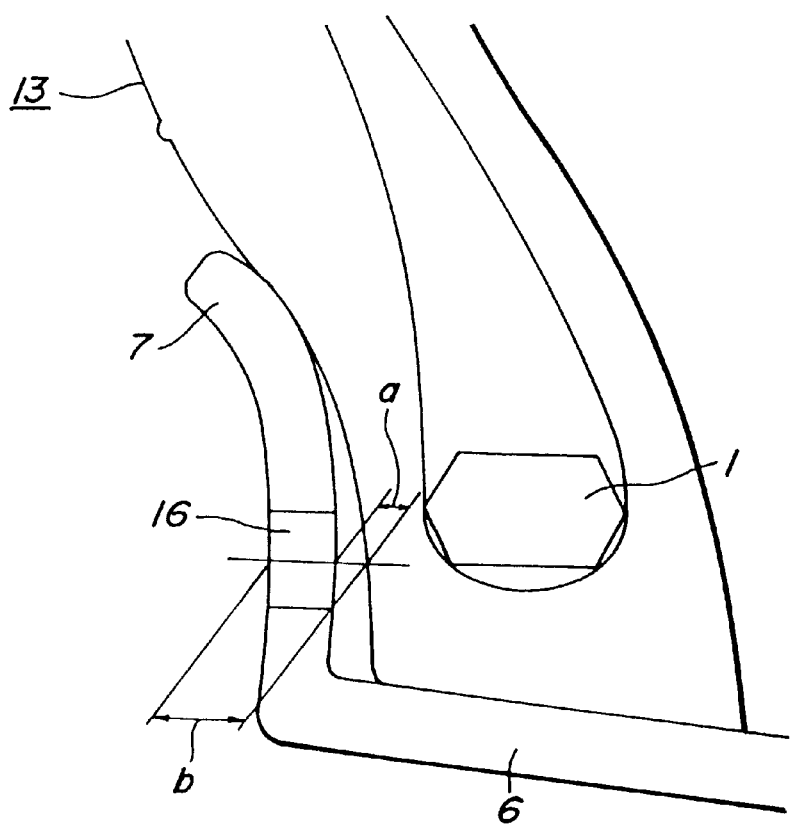
FIG. 6 is a schematic view illustrating an evaluation outline of a rim assembling operation.

Furthermore, rim slippage is evaluated by the resistance value applied to a planer 15 when a rim 14 mounted with a test tire 13 is fixed to a rotating shaft 12 and the planer 15 is driven at a state of applying a braking force of 30 t to the rotating shaft 12 through a braking device (not shown) as shown in FIG. 5. The measured resistance value is represented by an index on the basis that a limit force at a ground contact zone of the tire under a vehicle weight is 100, in which the larger the index value, the less the rim slippage.

Also, the rim assembling operation is evaluated by a gap a between an inner face of a rim flange and an outer surface of a bead portion which is calculated by assembling a test tire 13 onto a standard rim 6 provided with six holes 16 equally formed in a rim flange 7 near to rim base over a full circumference and measuring a depth b from an outer surface of the rim flange to an outer surface of a bead portion of the tire through the hole 16 and subtracting a thickness of the rim flange from the measured value. The rim assembling operation is represented by an index on the basis that the gap at a=0 is 100, in which the larger the index value, the better the property.

TABLE 1

| | Example 1 (FIG. 1) | Example 2 (FIG. 2) | Example 3 (FIG. 3) | Comparative Example 1 (FIG. 4a) | Comparative Example 2 FIG. 4b) |
|---|---|---|---|---|---|
| $M_{100}$ of protection rubber layer A (kgf/cm$^2$) | 30 | 30 | 26 | — | 30 |
| $M_{100}$ of protection rubber layer B (kgf/cm$^2$) | 45 | 48 | 48 | 45 | — |
| End $A_E$ of rubber layer A (*) | 23 mm (middle point between P and Q) | 30 mm (near to Q) | 12 mm (near to P) | — | — |
| End $B_S$ of rubber layer B (inclination angle α°) | 45° | 65° | 65° (adjacent to turnup portion) | — | — |
| Separation resistance | 100 | 100 | 120 | 80 | 100 |
| Crack resistance | 100 | 100 | 120 | 100 | 100 |
| Rim slippage | 100 | 120 | 100 | 100 | 80 |
| Rim assembling operation | 100 | 100 | 100 | 100 | 100 |

(*): distance measured outward from bead base line in radial direction of tire (mm)

As mentioned above, the invention can improve the bead portion durability particularly required in the pneumatic radial tire for large-size vehicles so as to satisfy the demand for improving the transportation under severer service conditions such as increase of authorized payload accompanied with the increase of the size in the construction vehicle and use on rough roads having many curves.

What is claimed is:

1. A pneumatic radial tire for large-size vehicle comprising;

a cylindrical crown portion, a pair of sidewall portions extending inward from both ends of the crown portion in a radial direction, a pair of bead portions extending inward from the sidewall portion, a radial carcass extending between the bead portions through the crown portion, a first protection rubber layer having a 100% modulus in the range of 25–40 kgf/cm$^2$ disposed in a region ranging from a vicinity of a bead heel to a rim line along an outer surface of the tire when the tire is mounted onto a standard rim and inflated under an internal pressure, a second protection rubber layer having a 100% modulus in the range of 30–50 kgf/cm$^2$ and higher than that of the first protection rubber layer and disposed in a region ranging from an inside of the first protection rubber layer in a widthwise direction of the tire to a bead base, an inner end of the first protection rubber layer in the radial direction of the tire being located between an outer end of a curved face of the bead heel in the radial direction and an end of a curved face of a rim flange, an outer end of the second protection rubber layer in the radial direction of the tire being located at such a position outward in the radial direction of the tire that an inclination angle defined between a line segment L connecting this end to a curvature center of the curved face of the rim flange and a phantom line BL passing through the curvature center and in parallel to a rotating axis of the tire is not less than 20°, and wherein the first protection rubber layer is arranged at the outside of the second protection rubber layer in a widthwise direction of the tire between the line segment L and the phantom line BL and extends to at least phantom line BL.

2. A pneumatic radial tire according to claim 1, wherein said inclination angle is not more than 80°.

* * * * *